US006303804B1

(12) United States Patent
Dougherty et al.

(10) Patent No.: US 6,303,804 B1
(45) Date of Patent: Oct. 16, 2001

(54) ENVIRONMENTALLY BENIGN BISMUTH-CONTAINING SPIN-ON PRECURSOR MATERIALS

(75) Inventors: T. Kirk Dougherty, Playa Del Rey; John J. Drab, Santa Barbara; O. Glenn Ramer, Los Angeles, all of CA (US)

(73) Assignee: Raytheon Company, El Segundo, CA (US)

( * ) Notice: Subject to any disclaimer, the term of this patent is extended or adjusted under 35 U.S.C. 154(b) by 0 days.

(21) Appl. No.: 09/394,422

(22) Filed: Sep. 13, 1999

Related U.S. Application Data

(63) Continuation-in-part of application No. 09/307,589, filed on May 7, 1999, now Pat. No. 6,054,600.

(51) Int. Cl.$^7$ .............................. C07F 19/00; C07F 7/00; C07F 9/00; B05D 5/12
(52) U.S. Cl. .................................. 556/30; 556/1; 556/44; 556/55; 427/126.3; 423/608; 423/617; 423/618
(58) Field of Search .................................. 556/30, 44, 55, 556/105; 427/126.3; 423/608, 617, 618

(56) References Cited

U.S. PATENT DOCUMENTS

| 5,434,102 | 7/1995 | Watanabe et al. | 437/130 |
| 5,439,845 | 8/1995 | Watanabe et al. | 437/130 |
| 5,514,822 | 5/1996 | Scott et al. | 556/28 |
| 5,721,009 | 2/1998 | Dougherty et al. | 427/126.6 |
| 5,784,310 | 7/1998 | Cuchiaro et al. | 365/145 |
| 5,885,648 | 3/1999 | Dougherty et al. | 427/8 |
| 5,908,658 | 6/1999 | Dougherty et al. | 427/79 |
| 6,054,500 | * 4/2000 | Dougherty et al. | 556/44 |

OTHER PUBLICATIONS

Araujo et al, "Fatigue–free ferroelectric capacitors with platinum electrodes", *Nature*, vol. 374, pp. 627–629, Apr. 13, 1995.

Callender et al, "Aqueous synthesis of water–soluble alumoxanes: Environmentally benign precursors to alumina and aluminum–based ceramics", *Chem. Mater.*, vol. 9, No. 11, pp. 2418–2433 (1997).

Workshop on Pollution Prevention Research Needs for the Semiconductor and Electronic Industries and their Suppliers, prepared by Research Triangle Institute, held May 4, 1995.

Kato et al, "Formation of complex alkoxides to control layer structure in Sr–Fi–M–O (M: Ta or NV) perovskite thin films", *Journal of Materials Science: Materials in Electronics*, vol. 9, pp. 457–464 (1998).

Bah, et al, "Heavy alkaline–Earth Polyether Carboxylates", *Inorg. Chem.*, vol. 36, No. 23, pp. 5413–5415 (1997).

* cited by examiner

*Primary Examiner*—Porfirio Nazario-Gonzalez
(74) *Attorney, Agent, or Firm*—Colin M. Raufer; Leonard A. Alkov; Glenn H. Lenzen, Jr.

(57) ABSTRACT

Metal acid salt complexes are provided comprising (1) a first metal ion consisting essentially of bismuth, and optionally, at least one second metal ion selected from the group consisting of barium, calcium, strontium, lead, titanium, tantalum, and niobium, and (2) a polyether acid. The metal acid salt complexes are prepared by combining (1) bismuth ion, and optionally, at least one second metal ion and (2) at least one of a polyether acid and a polyether acid anhydride prepared from the polyether acid. In particular, the use of a mixture of bismuth, strontium, and niobium and/or tantalum salts of the hydrophilic acid 3,6-dioxaheptanoic acid salt is described for production of ceramic thin films, such as for use in ferroelectric devices, using non-toxic solvents. As a consequence, improved electronic devices are formed from less toxic and easier handled precursors and solvents. The present invention provides soluble spin-on precursors which are compatible and soluble in non-toxic and environmentally benign solvents.

13 Claims, 1 Drawing Sheet

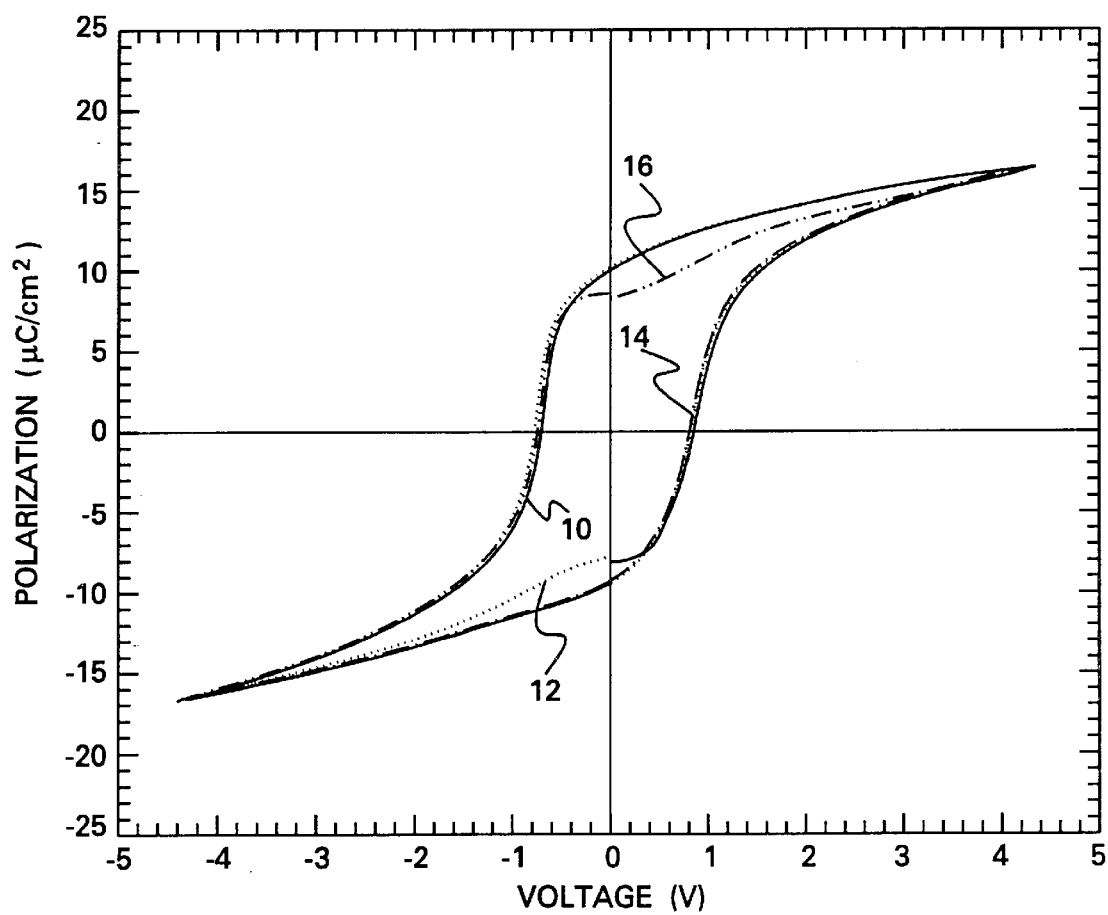

ENVIRONMENTALLY BENIGN BISMUTH-CONTAINING SPIN-ON PRECURSOR MATERIALS

CROSS-REFERENCE TO RELATED APPLICATION

The present application is a continuation-in-part application of application Ser. No. 09/307,589, filed on May 7, 1999, now U.S. Pat. No. 6,054,600. That application is directed to the formation of Group IV and V metal acid salt complexes from polyether acid anhydrides, useful in the practice of the present invention.

TECHNICAL FIELD

The present invention relates to an improved process for fabricating bismuth-containing ceramic materials, such as strontium bismuth tantalate, strontium bismuth niobate, strontium bismuth tantalate niobate, and bismuth titanate, and devices made therefrom via metallo-organic decomposition methods.

BACKGROUND ART

Aurivillius phase-based ceramics have been developed and patented by Symetrix Corporation for thin-film electronic applications. Such Aurivillius phases contain bismuth, together with at least one of strontium, calcuim, barium, and lead and with at least one of titanium, tantalum, and niobium; see, e.g., K. Kato et al, *Journal of Materials Science: Materials in Electronics*, Vol. 9, pp. 457–464 (1998). These Aurivillius phases give rise to ceramic materials such as strontium bismuth tantalate, strontium bismuth tantalate niobate, bismuth titanate, and strontium bismuth titanate.

Due to the fatigue-free properties of the ferroelectric material strontium bismuth tantalate (SBT), strontium bismuth niobate (SBN), and strontium bismuth tantalate niobate (SBTN), there has been considerable interest in fabricating new electronic devices from these materials. To date, these materials have predominately been made using a spin-on metal-organic decomposition (MOD) or sol-gel techniques. Other methods of depositing the films, such as sputtering, metal-organic chemical vapor deposition (MOCVD), liquid misted source chemical deposition (LMSCD), and jet or laser ablation deposition have been developed, but spin-on deposition remains the most popular deposition method. The reason for this is a combination of the simplicity of the spin-on process with the lack of major capitol equipment investment while still allowing the manufacture of very high quality films.

However, one big disadvantage of spin-on techniques is that they create large quantities of hazardous and environmentally hostile chemicals. One reason for this is because only a small fraction of the material initially placed on the wafer remains at the completion of the process. The remainder of the solution, including all of the hazardous solvents, are added only to facilitate processing and are removed from the film during the process as waste. In addition, large quantities of solvents are required for washing, rinsing and cleaning of the wafer surface prior to, during and after the spin-on deposition process.

As time progresses, the chemical process industry has become much more sensitive to the issue of hazardous wastes, such as the solvents used in these deposition processes, and has begun to act by regulating them or eliminating them. This has created a market for more environmentally-friendly materials and methods of manufacture. The semiconductor industry is well-known as a user of a large amount of hazardous materials and because of this has been targeted by communities and environmental groups. This has given the semiconductor industry a strong motivation to pursue more environmentally-friendly processes.

Thin film electrical devices using ferroelectric, paraelectric, and pryoelectric materials are an emerging technology with applications as diverse as nonvolatile memory, microactuators, gas sensors, and many others. However, the use of non-toxic environmentally benign materials for the processing of semiconductor devices (and virtually all processes/devices) is of utmost importance, due to the above-noted environmental concerns.

Symetrix Corp. has pioneered the work in SBT ($SrBi_2Ta_2O_9$) thin films. See, e.g., C. A. Paz de Araujo et al, "Fatigue Free Ferroelectric Capacitors with Platinum Electrodes", *Nature*, Vol. 374, pp. 627–629 (April 1995); U.S. Pat. No. 5,434,102, "Process for Fabricating Layered Superlattice Materials and Making Electronic Devices Including Same", issued on Jul. 18, 1995, to H. Watanabe et al; U.S. Pat. No. 5,439,845, "Process for Fabricating Layered Superlattice Materials and Making Electronic Devices Using Same", issued on Aug. 8, 1995, to H. Watanabe et al; U.S. Pat. No. 5,514,822, "Precursors and Processes for Making Metal Oxides", issued on May 7, 1996, to M. C. Scott et al; and U.S. Pat. No. 5,784,310, "Low Imprint Ferroelectric Material for Long Retention Memory and Method of Making the Same", issued on Jul. 21, 1998, to J. D. Cuchiaro et al.

Raytheon Corporation (and its earlier predecessor Hughes Electronics) has continued to improve and innovate on this work, specifically involving SBTN ($SrBi_2Ta_{2-x}Nb_xO_9$, where x=0 to 2). See, e.g., U.S. Pat. No. 5,721,009, "Controlled Carbon Content MOD Precursor Materials Using Organic Acid Anhydride", which describes the first use of an organic acid anhydride for fast controlled synthesis of MOD precursors for ceramic thin films; U.S. Pat. No. 5,885,648, issued Mar. 23, 1999, "Process for Making Stoichiometric Mixed Metal Oxide Films", describes the optimization of the SBTN materials for, e.g., ferroelectric applications; and U.S. Pat. No. 5,908,658, issued Jun. 1, 1999, "Process for Forming Thin Film Metal Oxide Materials Having Improved Electrical Properties", describes low leakage SBTN thin films developed for military applications.

Related application Ser. No. 09/307,589, filed May 7, 1999, "Polyether Acid Anhydride Useful for Improved Non-Toxic Solvent Soluble Group IV and V Metal Acid Salt Complexes" describes the first synthesis and use of the anhydride of 3,6-dioxaheptanoic acid for fast controlled synthesis of non-toxic solvent soluble MOD precursors for ceramic thin films. The titanium salt of 3,6-dioxaheptanoic acid is specifically described.

Another related application, application Ser. No. 09/395, 695, filed concurrently herewith [PD-98128], describes the precursor and process for making "Environmentally Benign Group II and Group IV or V Spin-On Precursor Materials". The related application is directed to the formation of II–IV or II–V ceramic oxide thin films, such as barium strontium titanate (BST), which are prevalent materials used for DRAM, energy storage and other paraelectric and ferroelectric applications.

A review of the need for environmentally benign ceramic precursors and the alumina precursor made from 3,6-dioxaheptanoic acid and an alumina mineral (Group III precursor) is described in "Aqueous Synthesis of Water- Soluble Alumoxanes: Environmentally Benign Precursors to Alumina and Alumina Based Ceramics", Chemical Materials, Vol. 9, No. 11, pp. 2418–2433 (1997).

The drive by the semiconductor industry to further reduce solvent usage is clear from the final report of the Workshop on Pollution Prevention Research Needs for the Semiconductor and Electronic Industries and Their Suppliers.

Thus, there is a recognized need for the use of environmentally benign ceramic precursors in general and specifically for use in the fabrication of bismuth-containing ceramics for electronic applications, such as strontium bismuth tantalate/niobate materials (SBT, SBN, SBTN).

DISCLOSURE OF INVENTION

In accordance with the present invention, metal acid salt complexes are provided comprising (1) a first metal ion consisting essentially of bismuth, and optionally, at least one second metal ion selected from the group consisting of barium, calcium, strontium, lead, titanium, tantalum, and niobium, and (2) a polyether acid. The metal acid salt complexes are prepared by combining (1) bismuth ion, and optionally, at least one second metal ion and (2) at least one of a polyether acid and a polyether acid anhydride prepared from the polyether acid.

In particular, the use of a mixture of bismuth, strontium, niobium and tantalum salts of the hydrophilic acid 3,6-dioxaheptanoic acid salt is described for production of ceramic thin films using non-toxic solvents. The anhydrous synthesis of the strontium and bismuth salt using the free acid is firstly described, followed by the synthesis of the tantalum and niobium salts using the anhydride of 3,6-dioxaheptanoic acid. The processing of a mixture of these in non-toxic solvents to give ferroelectric SBTN thin films is lastly described.

Specifically in accordance with the present invention, a method is provided for fabricating electronic devices comprising an active portion consisting essentially of strontium bismuth tantalate niobate. The method comprises:

(a) providing a substrate;

(b) forming a bottom electrode on the substrate;

(c) forming a metal acid salt complex comprising (1) a first metal ion consisting essentially of bismuth, and optionally, at least one second metal ion selected from the group consisting of barium, calcium, strontium, lead, titanium, tantalum, and niobium, and (2) a polyether acid;

(d) depositing a solution comprising the metal acid salt complex on the bottom electrode;

(e) forming a film of the bismuth-containing ceramic oxide from the solution; and (f) forming a top electrode on the film of bismuth-containing ceramic oxide.

The present invention enables a simple, less capitol intensive and environmentally-benign method of manufacturing such devices. The present invention provides for a new low toxicity method for production of SBT and SBTN thin films.

As a consequence, thin film materials have been made using the strontium, bismuth, tantalum, and niobium metal salts of 3,6-dioxaheptanioc acid (and more broadly, other polyether acids) as compared to the all-aliphatic acid analogues (for example, 2-ethylhexanoic acid or neodecanoic acid). These precursors are soluble and can be processed using much less toxic solvents and as such represent a major breakthrough in the "green" processing of microelectronic devices.

The present invention employs the metal salts of bismuth, strontium, tantalum and niobium with the acid 3,6-dioxaheptanoic acid to produce SBTN thin films. The solvents used are, for example, 2-propanol and water, which are considerably less toxic than xylenes and n-butyl acetate used in the prior art. Good ferroelectric properties of the processed thin films have been realized with the teachings of the present invention. Other bismuth-containing ceramic oxide thin films may also be prepared in accordance with the teachings herein, including bismuth titanate and bismuth strontium tantalate.

As such, the present invention provides an environmentally friendly method of producing a variety of ceramic oxide-based electronic devices, such as ferroelectric capacitors.

BRIEF DESCRIPTION OF THE DRAWINGS

The sole FIGURE is a plot on coordinates of polarization (in $\mu C/cm^2$) and voltage (in V), depicting the hysteretic properties of strontium bismuth tantalate niobate, prepared in accordance with the teachings herein.

BEST MODES FOR CARRYING OUT THE INVENTION

The present invention provides bismuth-containing thin films and thin film precursors. The materials described are soluble and processable/compatible in much less toxic solvents than the prior art.

The present invention is directed to the use of the metal salts of bismuth and other metals with 3,6-dioxaheptanoic acid to produce improved quality ceramic oxide films. For example, a mixture of the metal salts of bismuth, strontium, tantalum, and niobium may be used to prepare SBTN films. However, other polyether salts may also be employed in the practice of the present invention. Further, any of the Aurivillius phases, represented as $(Bi_2O_2)^{2+}(A_{m-1}B_mO_{3m+1})^{2-}$, may be prepared, where A is a $Sr^{2+}$, $Ca^{2+}$, $Ba^{2+}$, or $Pb^{2+}$ ion, and B is a $Ti^{4+}$, $Ta^{5+}$, or $Nb^{5+}$ ion. If m=2 in the tantalates or niobates, the representations are $SrBi_2Ta_2O_9$ (SBT), $SrBi_2Nb_2O_9$ (SBN), and the solid solutions of $SrBi_2(Nb_xTa_{1-x})_2O_9$ (SBTN). If m=3 in the titanates, then the representation is $Bi_4Ti_3O_{12}$, where bismuth is at both the Bi layers and the A-cation sites (A=Bi).

The solvents preferably used are 2-propanol and water, which are considerably less toxic than xylenes and n-butyl acetate used in the prior art. However, other polar, non-toxic solvents, such as low molecular weight alcohols, may also be employed in the practice of the present invention. The low molecular weight alcohols have no more than five carbon atoms.

The present invention allows production of improved metal oxide precursor for ceramics and metal oxide thin films. It extends the use of the polyether acids (one example being 3,6-dioxaheptanoic acid) as precursor salts to the bismuth and second metal oxides. Other examples of polyether acids include 3,6,9-trioxaheptanoic acid, methoxy acetic acid, and ethoxy acetic acid. Essentially, the polyether acids useful in the practice of the present invention are polyethers of ethylene glycol, having the formula

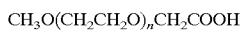

$CH_3O(CH_2CH_2O)_nCH_2COOH$ where n is 0 to 2.

Summarizing, improved thin film materials have made using the metal salts of 3,6-dioxaheptanoic acid (and more broadly, other polyether acids) as compared to the all aliphatic acid analogues (for example, 2-ethylhexanoic acid or neodecanoic acid). These precursors are soluble and can be processed using much less toxic solvents.

The general synthetic route to providing polyether acid anhydride metal acid salt complexes is as follows:

1. Prepare polyether acid anhydride from corresponding polyether acid by combining the polyether acid with a dehydrating agent; and
2. Prepare metal acid salt complex by combining a mixture of the polyether acid anhydride and metal alkoxide, either simultaneously or sequentially. In some instances, it may be desirable to also include the corresponding polyether acid in the mixture.

The dehydrating agent used in the first reaction may comprise any of the known dehydrating agents used to convert organic acids to the corresponding anhydride. Examples include dicyclohexylcarbodiimide and acetic anhydride.

The metal alkoxide used in the second reaction may comprise any of the known alkoxides for that metal. In the case of bismuth, an organo-bismuth compound, other than an alkoxide, is used, since bismuth alkoxides are not commonly available. Examples of suitable organo-bismuth compounds include bismuth triphenyl and bismuth acetate.

Anhydrous Synthesis of Strontium(II)-3,6-Dioxaheptanoate

To a heated (gentle reflux), well-stirred mixture of 3,6-dioxaheptanoic acid (34.1 g, 0.254 mol) in 2-propanol (45 g) was carefully added in several portions strontium metal (dendritic, Strem cat. no. 38-0074, 10.08 g, 0.115 mol). The reaction and concurrent hydrogen evolution can be controlled by the rate of addition of the metal. The reaction mixture was allowed to reflux an additional hour after the entire amount of metal was added and dissolved. The water white clear solution weighed 88.6 grams giving a solution 11.34% Sr; 1.29 mmol/g.

Anhydrous Synthsis of Bismuth(III)-3,6-Dioxaheptanoate—Bismuth Triphenyl

To a heated (90° C. bath temperature), well-stirred mixture of triphenyl bismuth (71.1 g, 0.161 mol) was added 3,6-dioxaheptanoic acid (67 g, 0.5 mol) over a period of one hour. The exothermic reaction can be controlled by the rate of addition of the acid and monitored by the rate of reflux of the benzene by-product formed. Care should be taken to contain the benzene by use of an efficient reflux condenser. The reaction mixture was allowed to reflux an additional hour after the entire amount of acid was added. The clear yellow solution was placed on a rotary evaporator and the benzene was removed in vacuum. To this viscous material was added sufficient 2-propanol to give 144.4 g total mass. The resulting mobile liquid was calculated to contain 23.3% Bi, 1.11 moles Bi/g.

Alternate Synthesis of Bismuth(III)-3,6-Dioxaheptanoate—Bismuth Acetate

An excess (8.63 g, 0.064 mol) of methoxyethoxyacetic acid (Aldrich 40,701-1, Lot KS16825BR) was added to bismuth acetate (4.819 g, 0.0125 mol, Aldrich 40,158-7, Lot AU08112AU). The contents of the dry nitrogen purged mixture were heated to 150° C. in an oil bath. The solid metal salt dissolved after several minutes. Over a period of 4 hours, the volatile contents (acetic acid and excess of the polyether acid) were removed by vacuum distillation. The remaining viscous golden material had a mass of 8.242 g (31% calculated Bi, 108% yield; a small amount of the excess acid was not removed) of the bismuth salt of methoxyethoxy acetic acid. IR (thin film): 3485 (br) (O—H), 2899 (m), 2928 (m), 2831 (m) (C—H stretching), 1588 (br) (carbonyl-carboxylate), 1417 (m), 1319 (m), 1247 (m), 1096 (s), 932 (w), 893 (w), 714 (w). NMR (CDCl$_3$)—$^1$H: 4.18 (brd s, 2H), 3.75 (m, 2H), 3.60 (m, 2H), 3.40 (brd s, 3H); $^{13}$C: 58.78, 70.07, 71.0, 71.33, 176.17.

Synthesis of the Tantalum(V)-3,6-Dioxaheptanoate and Niobium(V)-3,6-Dioxaheptanoate The synthesis of these salts is described in the related application Ser. No. 09/307,589, supra. Briefly, the synthesis of the tantalum salt was performed as follows:

Into a dry nitrogen-purged, 100 mL, round-bottom flask was placed tantalum ethoxide (15 g, 0.037 mol) and 3,6-dioxaheptanoic acid anhydride (46.23 g, 0.18 mol, 5.0 equivalents). The reaction was heated to 120° C. using an external oil bath and the progress of the reaction was followed by $^1$H NMR spectroscopy. The exchange was complete after two hours. The contents of the flask were cooled and the materials concentrated via vacuum distillation to remove the by-product 3,6-dioxaheptanoic acid ethyl ester. The resulting yellow mobile liquid was soluble in the common polar organic solvents (total mass 35.2 gram, 19.0% tantalum). A small amount of this liquid was further concentrated to give a solvent/volatile-free viscous liquid for NMR analysis. $^1$H NMR (CDCl$_3$): 4.1 (brd s, 2H), 3.5 (m, 2H), 3.35 (m, 2H), 3.20 (m, 3H); $^{13}$C NMR (CDCl$_3$): 58.56, 68.29, 70.36, 71.52, 170.06.

The niobium salt was made analogously as the tantalum salt.

Formation of SBTN Thin Films

Strontium(II)-3,6-dioxaheptanoate, bismuth(II)-3,6-dioxaheptanoate, tantalum(V)-3,6-dioxaheptanoate and niobium-(V)-3,6-dioxaheptanoate were formed to a processable and non-toxic solvent containing precursor for use in fabricating SBTN thin films.

A SBTN precursor solution was made by combining 24.5 g of the 2-propanol solution of bismuth-(III)-3,6-dioxaheptanoate (0.027 mol Bi) described above; 9.2 g of the 1.29 mmol/g strontium(II)-3,6-dioxaheptanoate solution also described above (0.012 mol Sr), 29.5 g of a 2-propanol solution of tantalum(V)-3,6-dioxaheptanoate (described in application Ser. No. 09/307,589, 0.63 molar, 0.018 mol Ta), and 9.8 g of a 2-propanol solution of niobium(V)-3,6-dioxaheptanoate (described in application Ser. No. 09/307, 589, 0.510 molar, 0.005 mol Nb). This was further diluted by adding 33.6 g of 2-propanol and 0.5 g of water to give a clear homogeneous solution which was processed to give the SBTN ferroelectric capacitors as described below.

Formation of SBT and SBN Thin Films

Strontium bismuth tantalate (SBT) and strontium bismuth niobate thin films are made analogously as described above for SBTN thin films, starting with strontium(II)-3,6-dioxaheptanoate, bismuth(III)-3,6-dioxaheptanoate, and either tantalum(V)-3,6-dioxaheptanoate or niobium(V)-3,6-dioxaheptanoate, as the case may be. The same mixing procedure in 2-propanol is used.

Processing of Described SBTN Precursor to SBTN Thin Films

1. Substrate Preparation Including Bottom Electrode Evaporation.

A conventional 20 mil thick silicon wafer was prepared with 5000 Å of a wet thermal oxide (silicon). A 25 Å thick Ta adhesion layer followed by a 1800 Å thick Pt layer were then e-beam evaporated onto the oxidized silicon substrate. The electrodes were preannealed in oxygen for 30 min at 650° C. to oxidize the Ta layer and stabilize the Pt layer. The sheet resistance of the electrodes after this preanneal was approximately 0.73 ohm/square.

2. Deposition and Firing of Strontium Bismuth Tantalate Niobate Thin Film on the Electroded Substrate.

Wafers were coated with the SBTN solution described above using a 3.5 Krpm 60 sec spin. After coating, the wafers were slowly lowered onto a 320° C. hot plate and baked for 8 minutes. After the 320° C. hotplate bake, the wafers are placed in a rapid thermal processor and fired for 35 seconds at 725° C. This process was repeated four times to achieve the desired thickness. Once the deposition for all of the layers was complete, the wafers were fired in mini-brute furnace in flowing $O_2$ at 725° C. for 4 hours.

After firing, the wafers showed no signs of cracking and no adhesion failures. Inspection of the films showed the surface to be smooth and optical thickness measurements showed the completed films to be approximately 1800 Å thick.

3. Application of Top Electrode.

A 1000 Å Pt top electrode was e-beam evaporated through a shadow mask which contained a variety of dot sizes varying from approximately 10 to approximately 160 mils diameter. The now complete stack was annealed at 725° C. for 2 hours before electrical test.

4. Initial Electrical Test.

The devices were tested on an analytical prober. Contact to the top electrode was made directly with a probe tip, contact to the bottom electrode was made by scratching through the SBTN layer with a second probe tip. Hysteresis measurements were made using a Radiant Technology RT-66a tester operated in virtual ground mode both instruments were controlled using custom software. The thickness of the SBTN layer was 0.18 μm and the device size was $5.067 \times 10^{-4}$ $cm^2$. The test waveform was TRIANGLE and the test frequency was 3 Hz.

The hysteresis characteristic for this device is shown in the sole FIGURE. Curve 10 (—) is switched UP, Curve 12 (—) is unswitched DOWN, Curve 14 (—) is switched DOWN, and Curve 16 (—) is unswitched UP. In order to fully characterize the PE characteristics of a ferroelectric capacitor, a 5 loop hysteresis test was used. This test characterizes the switching and non-switching characteristics as well as the rapid depolarization for the capacitor in both directions.

The first loop of the 5 loop test is for set-up purposes and serves to put the capacitor in a known state, which is called polarized DOWN. The drive waveform is a triangle wave starting at 0 volts, going to +5 volts, then to −5 volts, and back to zero.

The second loop in the test is identical to the first and gives a full switching curve which has a gap at the bottom due to the rapid depolarization.

The third loop goes in the opposite direction and is called the unswitched DOWN curve. This curve begins at 0 V, goes to −5 V, +5 V, and back to 0V.

The fourth loop is the same as the third loop, but appears as a full switching curve because the capacitor was left in a polarized UP state by the third loop. The rapid depolarization on this curve appears at the top of the curve and may be different from the rapid depolarization obtained in the second loop due to imprinting of the capacitor.

The fifth and final loop in the test is the unswitched UP curve and is the same as the first and second curves, but appears different due to the polarization state left by loop 4. The curve shown in the sole FIGURE overlays all the data (centered on the P axis).

Summary

As such, it has been disclosed a thin film SBTN capacitor useful for memory, non-volatile memory, non-destructive read out memory, controller/processor imbedded memory, smart card and other applications using non-toxic solvents during the ceramic processing.

INDUSTRIAL APPLICABILITY

The method of formation of strontium bismuth tantalate niobate films is expected to find use in the fabrication of electronic devices using this material as the active portion of the device.

Thus, there has been described a process for forming improved strontium bismuth tantalate niobate films. It will be readily apparent to those skilled in this art that various changes and modifications of an obvious nature may be made, and all such changes and modifications are considered to fall within the scope of the appended claims.

What is claimed is:

1. A metal acid salt complex comprising (1) a first metal ion consisting essentially of bismuth, and optionally, at least one second metal ion selected from the group consisting of barium, calcium, strontium, lead, titanium, tantalum, and niobium, and (2) a polyether acid.

2. The metal acid salt complex of claim 1 wherein said second metal ion consists essentially of titanium.

3. The metal acid salt complex of claim 1 wherein said second metal ion consists essentially of strontium and at least one of tantalum and niobium.

4. The metal acid salt complex of claim 1 wherein said polyether acid is given by the formula

where n is 0 to 2.

5. A method of preparing a metal acid salt complex, said method comprising combining (1) a first organo-metallic compound containing bismuth ion, and optionally, at least one second organo-metallic compound having a second metal ion selected from the group consisting of barium, calcium, strontium, lead, titanium, tantalum, and niobium, and (2) at least one of a polyether acid and a polyether acid anhydride prepared from said polyether acid.

6. The method of claim 5 wherein said second metal ion consists essentially of titanium.

7. The method of claim 6 wherein said second metal ion consists essentially of strontium and at least one of tantalum and niobium.

8. The method of claim 6 wherein said polyether acid is given by the formula

where n is 0 to 2.

9. A process for preparing a metal acid salt complex comprising (1) a first metal ion consisting essentially of bismuth, and optionally, at least one second metal ion selected from the group consisting of barium, calcium, strontium, lead, titanium, tantalum, and niobium, and (2) a polyether acid, said process comprising:

(a) preparing a polyether acid anhydride from said polyether acid; and (b) combining an organo-bismuth compound and a metal alkoxide containing said second metal ion with at least one of said polyether acid and said polyether acid anhydride to form said salt complex.

10. The process of claim 9 in which said organo-bismuth compound is selected from the group consisting of bismuth triphenyl and bismuth acetate.

11. The method of claim 9 wherein said second metal ion consists essentially of titanium.

12. The method of claim 9 wherein said second metal ion consists essentially of strontium and at least one of tantalum and niobium.

13. The process of claim 9 wherein said polyether acid is given by the formula

where n is 0 to 2.

* * * * *